United States Patent
Kim et al.

(10) Patent No.: US 8,178,621 B2
(45) Date of Patent: May 15, 2012

(54) COMPOSITION FOR CROSSLINKABLE POLYIMIDE PRECUSOR, METHOD OF MANUFACTURING CROSS-LINKED POLYIMIDE, AND POLYIMIDE FILM

(75) Inventors: Sangmo Kim, Hwaseong-si (KR); Youngsuk Jung, Suwon-si (KR); Yooseong Yang, Daejeon (KR); Byung-Hee Sohn, Yongin-si (KR); Eunseog Cho, Seoul (KR)

(73) Assignee: Samsung Electronics Co., Ltd. (KR)

( * ) Notice: Subject to any disclaimer, the term of this patent is extended or adjusted under 35 U.S.C. 154(b) by 111 days.

(21) Appl. No.: 12/778,316

(22) Filed: May 12, 2010

(65) Prior Publication Data
US 2011/0105689 A1 May 5, 2011

(30) Foreign Application Priority Data
Oct. 29, 2009 (KR) .................. 10-2009-0103695

(51) Int. Cl.
| | |
|---|---|
| C08F 8/00 | (2006.01) |
| C08F 12/30 | (2006.01) |
| C08F 14/14 | (2006.01) |
| C08F 20/06 | (2006.01) |
| C08F 118/02 | (2006.01) |
| C08F 210/00 | (2006.01) |
| C08G 75/00 | (2006.01) |

(52) U.S. Cl. ..... 525/150; 528/172; 526/348; 526/317.1; 526/319; 526/286; 526/291

(58) Field of Classification Search .................. 525/150; 528/172; 526/348, 317.1, 319, 286, 291
See application file for complete search history.

(56) References Cited

U.S. PATENT DOCUMENTS
3,799,880 A * 3/1974 Kelly et al. .................. 510/453

FOREIGN PATENT DOCUMENTS
| | | |
|---|---|---|
| JP | 07-080813 | 3/1995 |
| JP | 2008-001876 | 1/2008 |
| JP | 2008-255252 | 10/2008 |
| KR | 1020080035431 A | 4/2008 |

OTHER PUBLICATIONS
"Peptide Synthesis by Means of tert-Butyloxycarbonylamino Acid Derivatives of Poly(ethylene-co-N-hydroxymaleimide)"; Authors: Mati Fridkin, et al.; Biochemistry, vol. 11, No. 3, pp. 466-471 (1972).
"Bulk and Surface Properties of Maleimide Copolymers: Effect of Fluorinated Side Chains"; Authors: Dietmar Appelhans, et al.; Macromolecules 2005, 38, pp. 1655-1664.
"Condensation Kinetics of Polyphthalamides. II. Polyesters and Diamines"; Authors: Edith Hellmann, et al.; Polymer Engineering and Science, 2007, pp. 1600-1609.
"Toward Cross-Linked Degradable Polyester Materials: Investigations into the Compatibility and Use of Reductive Amination Chemistry for Cross-Linking"; Authors: Brooke A. Van Horn, et al.; Macromolecules 2007, 40, pp. 1480-1488.

* cited by examiner

*Primary Examiner* — William Cheung
(74) *Attorney, Agent, or Firm* — Cantor Colburn LLP

(57) ABSTRACT

A polyimide precursor composition includes an oligomer or polymer having a substituted or unsubstituted carbonyl group only in a side chain and a diamine compound. A method of manufacturing a polyimide, and a polyimide film, are also disclosed.

14 Claims, 4 Drawing Sheets

COMPOSITION FOR CROSSLINKABLE POLYIMIDE PRECUSOR, METHOD OF MANUFACTURING CROSS-LINKED POLYIMIDE, AND POLYIMIDE FILM

CROSS-REFERENCE TO RELATED APPLICATION

This application claims priority to Korean Patent Application No. 10-2009-0103695 filed on Oct. 29, 2009, and all the benefits accruing therefrom under 35 U.S.C. 119, the content of which in its entirety is herein incorporated by reference.

BACKGROUND

1. Field

This disclosure relates to a cross-linkable polyimide precursor composition, a method of manufacturing a cross-linked polyimide, and a polyimide film manufactured using the method.

2. Description of the Related Art

Polyimide films have been used in a variety of applications including in displays, due to the excellent electric mechanical properties of polyimides. Particularly, polyimides may be used as substrates in display devices to obtain a flexible display device.

Polyimides may generally be prepared by reacting an acid dianhydride and a diamine compound to initially provide a polyamic acid and then heating the polyamic acid in an imidization reaction to provide the polyimide. Further, ross-linked polyimides may generally be prepared by including a reactive end-capping reagent in addition to the acid dianhydride and diamine compound, to provide an amic acid oligomer and/or an imide oligomer and performing an additional curing process.

SUMMARY

As described above, a process of preparing a cross-linked polyimide may necessitate introducing additional functional groups, such as for crosslinking purposes, and thus an additional processing step, so the process conditions may change depending upon the additional functional group used. In addition, it may be difficult to control the cross-linking rate that determines the thermal characteristics of the polyimide, where such general methods as that described above are used.

Thus, in an embodiment, a cross-linkable polyimide precursor composition is disclosed, in which thermal deterioration is prevented by increasing thermal stability by controlling the cross-linking rate, without need for additional processes.

In another embodiment, a method of manufacturing a cross-linked polyimide is disclosed which uses the cross-linkable polyimide precursor composition.

In another embodiment, a polyimide film manufactured by the method is disclosed.

In an embodiment, a cross-linkable polyimide precursor composition includes an oligomer or polymer including a substituted or unsubstituted carbonyl group only in a side chain, and a diamine compound.

In another embodiment, a method of manufacturing a cross-linked polyimide includes reacting an oligomer or polymer having a substituted or unsubstituted carbonyl group only in a side chain and a diamine compound to form a polyamide, and imidizing the polyamide.

In another embodiment, a polyimide film includes a polymer obtained by cross-linking an oligomer or polymer having a substituted or unsubstituted carbonyl group only in a side chain and a diamine compound.

The oligomer or polymer may include a moiety represented by the following Chemical Formula 1, and the diamine compound may include a monomer represented by the following Chemical Formula 2.

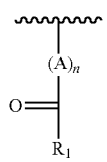

Chemical Formula 1

In the above Chemical Formula 1, the wavy line represents a main chain without a carbonyl group of the oligomer or polymer, A is a linker connecting the main chain to a carbonyl group and may include a substituted or unsubstituted C1 to C30 alkylene, a substituted or unsubstituted C1 to C30 cycloalkylene, a substituted or unsubstituted C6 to C30 arylene, a substituted or unsubstituted C7 to C30 arylalkylene, a substituted or unsubstituted C1 to C30 heteroalkylene, a substituted or unsubstituted C2 to C30 heterocycloalkylene, or a combination thereof, n is 0 or 1, and $R_1$ is a functional group including oxygen, nitrogen, sulfur, a halogen, a metal, a metalloid, or a combination thereof.

Chemical Formula 2

In the above Chemical Formula 2, D includes a substituted or unsubstituted C1 to C30 alkylene, a substituted or unsubstituted C3 to C30 cycloalkylene, a substituted or unsubstituted C6 to C30 arylene, a substituted or unsubstituted C7 to C30 arylalkylene, a substituted or unsubstituted C1 to C30 heteroalkylene, a substituted or unsubstituted C2 to C30 heterocycloalkylene, a substituted or unsubstituted C2 to C30 alkenylene, or a combination thereof.

The main chain of the oligomer or polymer is a homopolymer or copolymer which includes a substituted or unsubstituted polyethylene, a substituted or unsubstituted polyether, a substituted or unsubstituted polyimine, a substituted or unsubstituted polysulfone, a substituted or unsubstituted polyvinyl, a substituted or unsubstituted polyolefin, a substituted or unsubstituted polyalkyne, a substituted or unsubstituted polynorbornene, a substituted or unsubstituted polysiloxane, a substituted or unsubstituted polyphosphazene, a substituted or unsubstituted polysaccharide, or a combination thereof.

$R_1$ may be selected from the following group G:

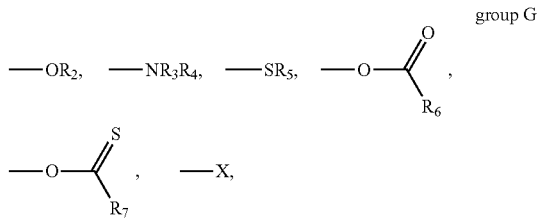

group G or a combination thereof.

In group G, each $R_2$ to $R_7$ is independently hydrogen, a substituted or unsubstituted C1 to C30 alkyl, a substituted or unsubstituted C3 to C30 cycloalkyl, a substituted or unsubstituted C6 to C30 aryl, a substituted or unsubstituted C7 to C30 arylalkyl, a substituted or unsubstituted C1 to C30 heteroalkyl, a substituted or unsubstituted C2 to C30 heterocycloalkyl, a substituted or unsubstituted C2 to C30 alkenyl, a substituted or unsubstituted C1 to C10 alkoxy, a substituted or unsubstituted C2 to C10 carbonyl, a hydroxyl, or a combination thereof, and X is a halogen.

The carbonyl group may include a carboxylic acid, substituted or unsubstituted carboxylate salt, a substituted or unsubstituted ester group, a substituted or unsubstituted amide group, a substituted or unsubstituted imide group, or a combination thereof.

The oligomer or polymer may be included in an amount of about 0.1 to about 99.9 wt % based on the total amount of the cross-linkable polyimide precursor composition, and the diamine compound may be included in an amount of about 0.1 to about 99.9 wt % based on the total amount of the cross-linkable polyimide precursor composition.

In the manufacturing method, imidizing may include heating the polyamide at a temperature of about 25 to about 350° C.

In a further embodiment, imidizing may include heating the polyamide at a temperature of about 100 to about 250° C.

In an embodiment, reacting to form the polyamide and imidizing may be simultaneously performed.

In the polyimide film, the polymer is represented by the following Chemical Formula 3.

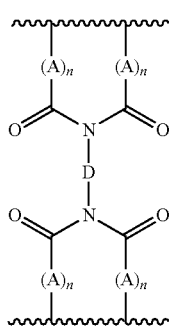

Chemical Formula 3

In the above Chemical Formula 3, the wavy line represents a main chain without a carbonyl group of the oligomer or polymer, A is a linker connecting the main chain to a carbonyl group and includes a substituted or unsubstituted C1 to C30 alkylene, a substituted or unsubstituted C1 to C30 cycloalkylene, a substituted or unsubstituted C6 to C30 arylene, a substituted or unsubstituted C7 to C30 arylalkylene, a substituted or unsubstituted C1 to C30 heteroalkylene, a substituted or unsubstituted C2 to C30 heterocycloalkylene, or a combination thereof, n is 0 or 1, and D is a substituted or unsubstituted C1 to C30 alkylene, a substituted or unsubstituted C3 to C30 cycloalkylene, a substituted or unsubstituted C6 to C30 arylene, a substituted or unsubstituted C7 to C30 arylalkylene, a substituted or unsubstituted C1 to C30 heteroalkylene, a substituted or unsubstituted C2 to C30 heterocycloalkylene, a substituted or unsubstituted C2 to C30 alkenylene, or a combination thereof.

The polymer may include the polyamide, the polyimide, or a mixture of the polyamide and the polyimide.

DETAILED DESCRIPTION

Figure 1:
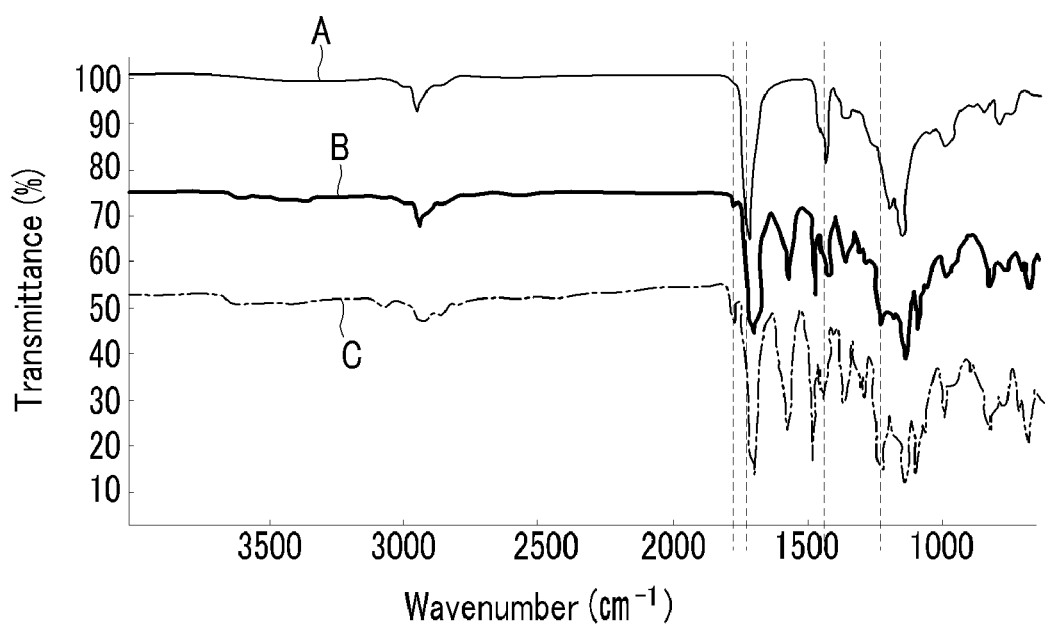
FIGS. 1 and 2 are Fourier transform infrared ("FTIR") spectrographs showing transmission peaks corresponding to functional groups of a polyimide according to examples and comparative examples.

Exemplary embodiments of the present invention will hereinafter be described in detail referring to the following accompanied drawings, and can be easily performed by those who have common knowledge in the related art. However, these embodiments are only exemplary, and the present invention is not limited thereto.

As used herein, the terms "a" and "an" are open terms that may be used in conjunction with singular items or with plural items. It will be further understood that the terms "comprises" and/or "comprising," when used in this specification, specify the presence of stated features, regions, integers, steps, operations, elements, and/or components, but do not preclude the presence or addition of one or more other features, regions, integers, steps, operations, elements, components, and/or groups thereof. All ranges and endpoints reciting the same feature are independently combinable.

As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, when a definition is not otherwise provided, the term "substituted" refers to one substituted with an substituent selected from a C1 to C30 alkyl, a C2 to C30 alkynyl, a C6 to C30 aryl, a C7 to C30 arylalkyl, a C1 to C4 oxyalkyl, a C1 to C30 heteroalkyl, a C3 to C30 heteroarylalkyl, a C3 to C30 cycloalkyl, a C3 to C15 cycloalkenyl, a C6 to C30 cycloalkynyl, a C2 to C30 heterocycloalkyl, a halogen including F, Cl, Br, or I, a hydroxy, an alkoxy, a nitro, a cyano, an amino, an azido, an amidino, a hydrazino, a hydrazono, a carbonyl, a carbamyl, a thiol, an ester, a carboxyl or a salt thereof, sulfonic acid or a salt thereof, phosphoric acid or a salt thereof, and a combination thereof.

As used herein, when a definition is not otherwise provided, the term "hetero" with respect to, for example, a heteroalkylene, heterocycloalkylene, or the like, refers to a structure including 1 to 3 heteroatoms of N, O, S, or P.

Hereinafter, the cross-linkable polyimide precursor composition according to an embodiment is described.

The cross-linked polyimide precursor composition includes an oligomer or polymer including a substituted or unsubstituted carbonyl group only in a side chain, and a diamine compound, and may further include a solvent.

The oligomer or polymer includes an alkylene, a cycloalkylene, an arylene, an arylalkylene, a heteroalkylene, a heterocycloalkylene, or a combination thereof in its main chain and a side chain linked to the main chain.

The side chain linked to the main chain may be represented by the following Chemical Formula 1.

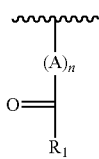

Chemical Formula 1

In the above Chemical Formula 1, the wavy line indicates a main chain without a carbonyl group of the oligomer or polymer.

Also in Chemical Formula 1, A is a linker connecting the main chain to the side chain, that is, a linker connecting the main chain to a carbonyl group. Further, n is 0 or 1, wherein when n is 0, the carbonyl group is directly connected to the main chain. The main chain is simply illustrated for better understanding and ease of description, but does not include a carbonyl group, and the length and shape of chain may be vary.

A may be a substituted or unsubstituted C1 to C30 alkylene, a substituted or unsubstituted C1 to C30 cycloalkylene, a substituted or unsubstituted C6 to C30 arylene, a substituted or unsubstituted C7 to C30 arylalkylene, a substituted or unsubstituted C1 to C30 heteroalkylene, a substituted or unsubstituted C2 to C30 heterocycloalkylene, or a combination thereof.

The $R_1C=O$ moiety in Chemical Formula 1 is a substituted or unsubstituted carbonyl group, where the carbonyl group includes a carboxylic acid (where $R_1$ is OH), substituted or unsubstituted carboxylate salt (where $R_1$ is $—O^-Z^+$ where Z is a substituted or unsubstituted cation), a substituted or unsubstituted ester group, a substituted or unsubstituted amide group, a substituted or unsubstituted imide group, or a combination thereof.

$R_1$ is a leaving group that is removed during a reaction, and is a functional group having oxygen, nitrogen, sulfur, a halogen, a metal, a metalloid, or a combination thereof. For example, $R_1$ may include the following group G.

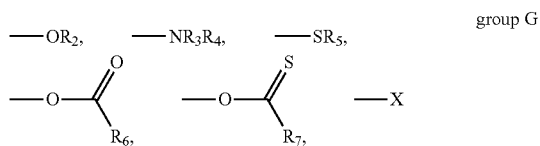

group G

In the group G, each $R_2$ to $R_7$ is independently hydrogen, a substituted or unsubstituted C1 to C30 alkyl, a substituted or unsubstituted C3 to C30 cycloalkyl, a substituted or unsubstituted C6 to C30 aryl, a substituted or unsubstituted C7 to C30 arylalkyl, a substituted or unsubstituted C1 to C30 heteroalkyl, a substituted or unsubstituted C2 to C30 heterocycloalkyl, a substituted or unsubstituted C2 to C30 alkenyl, a substituted or unsubstituted C1 to C10 alkoxy, a substituted or unsubstituted C2 to C10 carbonyl, a hydroxy, or a combination thereof, and X is a halogen such as F, Cl, Br, or I. Metals may include for example alkali or alkaline earth metal including Li, Na, K, Cs, Ba, Mg, Ca, and the like, a transition metal such as Fe, Ni, Co, Zn, Cu, and the like, a main group metal such as Al, Sn, and the like, or combinations thereof. Metalloids may include, for example, B, Si, Ge, or the like, or combinations thereof.

Where The $R_1C=O$ moiety is a carboxylate salt of formula $—(C=O)—O^-Z^+$, having a cation Z+, the cation may be derived from a metal such as those described above, an organic cation such as a substituted or unsubstituted organoammonium, a substituted or unsubstituted organophosphonium, a substituted or unsubstituted carbonium including an arylcarbonium, an organotransition metal complex, and the like, or a combination thereof.

The oligomer or polymer main chain include homopolymers or copolymers including, for example, a substituted or unsubstituted polyethylene, a substituted or unsubstituted polyether, a substituted or unsubstituted polyimine, a substituted or unsubstituted polysulfone, a substituted or unsubstituted polyvinyl, a substituted or unsubstituted polyolefin, a substituted or unsubstituted polyalkyne, a substituted or unsubstituted polynorbornene, a substituted or unsubstituted polysiloxane, a substituted or unsubstituted polyphosphazene, a substituted or unsubstituted polysaccharide, and the like. Where copolymers are used, the copolymers may be random, block, or alternating copolymers, and where the copolymers are block copolymers, two or more blocks may be included which may be homopolymers, random copolymers, or alternating copolymers. Graft copolymers may also be used. In an exemplary embodiment, a useful polymer is a copolymer of an anhydride such as maleic anhydride, itaconic anhydride, citraconic anhydride, or the like, copolymerized with a comonomer such as ethylene, propylene, butylene, styrene, butadiene, norbornene, substituted norbornenes, and the like. In an exemplary embodiment, useful polymers include poly(ethylene-alt-maleic anhydride), poly(styrene-alt-maleic anhydride), or a combination thereof.

The diamine compound may include a monomer represented by the following Chemical Formula 2.

$H_2N-D-NH_2$            Chemical Formula 2

In the above Chemical Formula 2, D may include a substituted or unsubstituted C1 to C30 alkylene, a substituted or unsubstituted C3 to C30 cycloalkylene, a substituted or unsubstituted C6 to C30 arylene, a substituted or unsubstituted C7 to C30 arylalkylene, a substituted or unsubstituted C1 to C30 heteroalkylene, a substituted or unsubstituted C2 to C30 heterocycloalkylene, a substituted or unsubstituted C2 to C30 alkenylene, or a combination thereof.

Exemplary groups D may include:

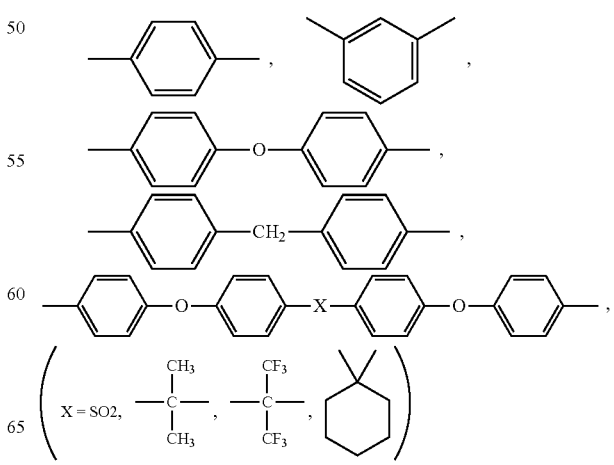

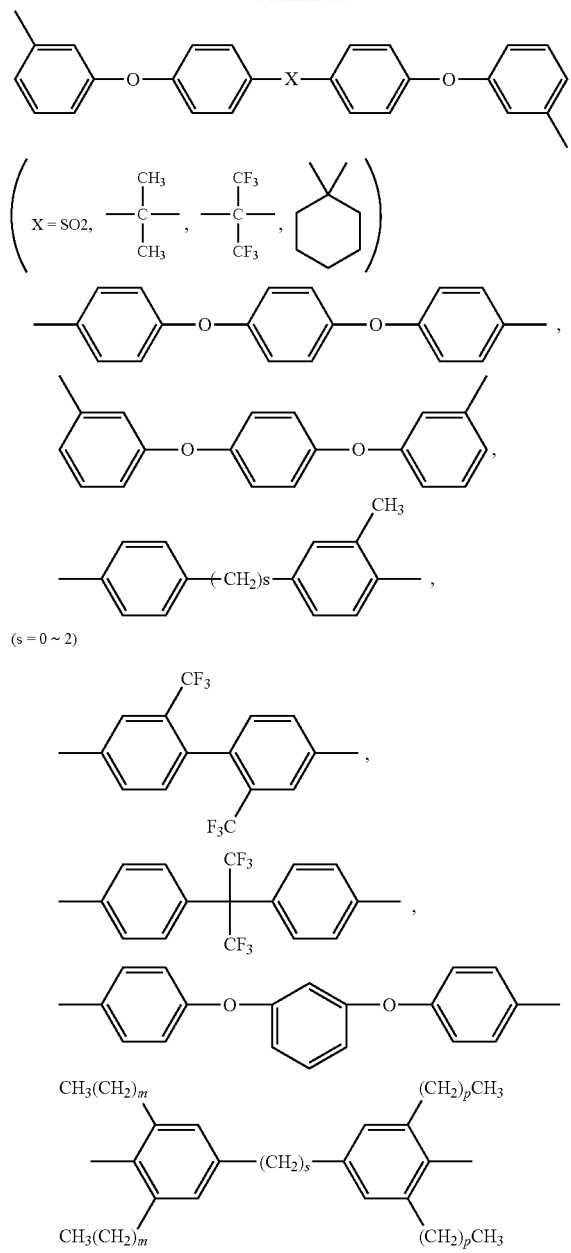

wherein m, n, p, and q are each independently an integer of 0 to 18, and s is an integer of 0 to 2,

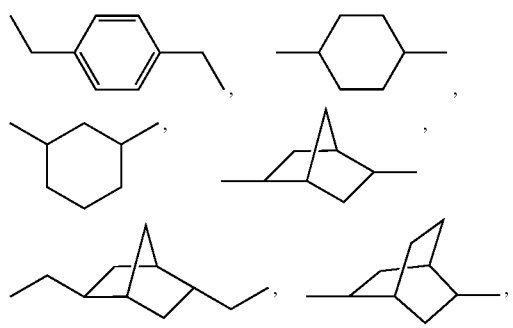

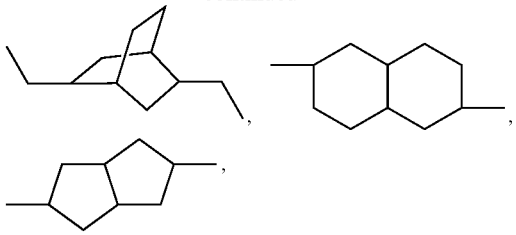

and any combination thereof.

In an exemplary embodiment, the diamine compound of Formula 2 may be bis[4-(3-aminophenoxy)phenyl]sulfone ("BAPS") represented by Formula 3 or 2,2-bis[4-(4-aminophenoxy)phenyl]propane ("BAPP") represented by Formula 4.

Formula 3
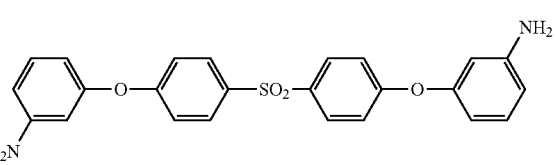

Formula 4
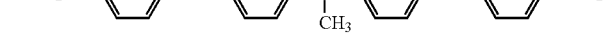

A carbonyl group in the side chain of the polymers or oligomers is reacted with an amine group of the diamine compound to provide a chemical bond therebetween. The chemical bond may be ionic, covalent, coordinate, or a combination thereof or may form one or more bonds as an intermediate. In an embodiment, the oligomer or polymer may be allowed to pre-react with the diamine to form an ionomer, followed by further reaction to form the amide. In an embodiment, the chemical bond is a covalent bond after reacting to form the amide. In this way, the oligomers or polymers form an amide bond between side chains to be cross-linked without the additional thermosetting reaction. This will be further described later.

The cross-linkable polyimide precursor composition may further include additives such as a catalyst, a dehydrating agent, or the like. Exemplary catalysts may include acid catalysts such as hydrochloric acid, sulfuric acid, p-toluenesulfonic acid, or the like, amine-based catalysts such as N,N-dimethylaminopyridine, 4-pyrrolidinopyridine, or the like, or a combination thereof. Exemplary dehydrating agents may include for example dicyclohexylcarbodiimide ("DCC"), N,N-dimethyl-3-propyl ethyl carbodiimide hydrochloride, or the like, or a combination thereof.

The oligomer or polymer and the diamine compound may be mixed in a solvent.

The solvent may be any solvent that is capable of dissolving the oligomer or polymer and the diamine compound. Exemplary solvents include deionized water, methanol, ethanol, propanol, isopropanol, 2-methoxyethanol, 2-ethoxyethanol, 2-propoxyethanol 2-butoxyethanol, methylcellosolve, ethylcellosolve, diethyleneglycolmethylether, diethyleneglycolethylether, dipropyleneglycolmethylether, toluene, xylene, ethylacetate, butylacetate, diethyleneglycoldimethylether, diethyleneglycoldimethylethylether, methylmethoxypropionic acid, ethylethoxypropionic acid, ethyllactic acid, propyleneglycolmethyletheracetate, propyleneglycolmethylether, propyleneglycolpropylether, methylcellosolveacetate, ethylcellosolveacetate, diethyleneglycolmethylacetate, diethyleneglycolethylacetate, acetone, methylisobutylketone, 2-heptanone, cyclohexanone, dimethyl formamide (DMF), N,N-dimethyl acetamide (DMAc), N-methyl-2-pyrrolidone, γ-butyrolactone, diethylether, ethyleneglycoldimethylether, diglyme, tetrahydrofuran, acetylacetone, acetonitrile, and the like. These solvents can be used in a mixture of one or more.

The oligomer or polymer may be included in an amount of about 0.1 to about 99.9 wt % based on the total amount of the cross-linkable polyimide precursor composition, and the diamine compound may be included in an amount of about 0.1 to 99.9 wt % based on the total amount of the cross-linkable polyimide precursor composition.

The solvent may be included in a balance excepting the amount of the oligomer or polymer and the diamine compound.

Hereinafter, a method of manufacturing a cross-linked polyimide using the cross-linkable polyimide precursor composition will be described.

The method of manufacturing the cross-linked polyimide includes reacting an oligomer or polymer having a substituted or unsubstituted carbonyl group only in a side chain and a diamine compound to form a polyamide, and then imidizing the polyamide.

Reacting to form the polyamide includes mixing the oligomer or polymer with the diamine compound in a solvent to provide a polyamide and evaporating the solvent from the polyamide.

The diamine compound may be included in amounts of about 0.01 to about 1.5 equivalents based on 1 equivalent of the oligomer or polymer.

The polyamide may, in this way, be obtained by a reaction of the following Reaction Scheme 1.

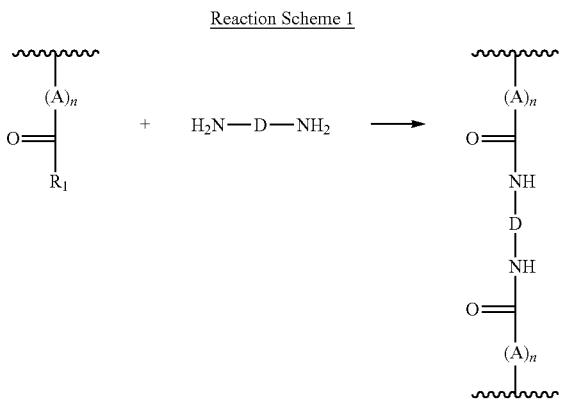

In Reaction Scheme 1, A, $R_1$, D, and n are as described above.

As shown in Reaction Scheme 1, the carbonyl group of the oligomer or polymer side chain bonds to the amine group of the diamine compound to provide a polyamide with an amide bond, so that a plurality of oligomers or polymers are cross-linked.

The step of imidizing the polyamide including heating at a temperature of, for example, about 25 to about 350° C. In an embodiment, heating may performed at a temperature of about 100 to about 250° C.

Imidizing is represented by the following Reaction Scheme 2.

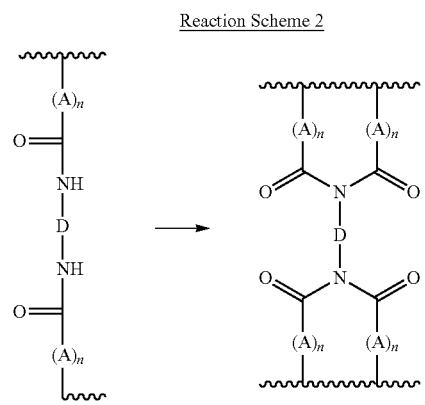

In Reaction Scheme 2, A, n and D are as described above.

In addition, reacting to form the polyamide and imidizing may be simultaneously performed. In this case, the polyimide precursors are mixed and heated to form the polyamide, the polyimide, or a mixture of the polyamide and the polyimide.

In an embodiment, the carbonyl group of the oligomer or the polymer side chain is reacted with the amine group of the diamine compound to provide a chemical bond therebetween. In this way, the oligomers or the polymers form an amide bond or an imide bond between side chains to be cross-linked without an additional thermosetting reaction.

Generally, in order to provide a cross-linked polyimide from an acid dianhydride and a diamine compound, an additional thermosetting reaction has been used, in which an additional functional group such as maleimide, norbornene, benzocyclo butene, acetylene, or phenylacetylene to the terminal end of the imide compound is included. However, the polyimides disclosed herein do not require inclusion of such additional functional group or an additional thermosetting reaction, and thus simplify the process of forming a cross-linked polyimide.

The polyimide film so obtained may control and improve the thermal stability by adjusting the cross-linking rate, which may be adjusted by varying temperature, relative concentrations of carbonyl groups in the oligomer or polymer, solution concentrations of oligomer or polymer and/or diamine compound, or where used, catalyst type and concentration and/or dehydrating agent type and concentration. Advantageously, the polyimide so formed may be provided at a lower temperature and hence with fewer by-products. Accordingly, the heat resistance an electronic device or an optical device such as a substrate for a display may improve with use of the polyimide film disclosed herein.

The polyimide film includes a polymer obtained by cross-linking an oligomer or polymer including a substituted or unsubstituted carbonyl group only in a side chain, and a diamine compound. The polymer includes a polyamide, a polyimide, or a mixture of a polyamide and a polyimide.

The polymer may be represented by the following Chemical Formula 3:

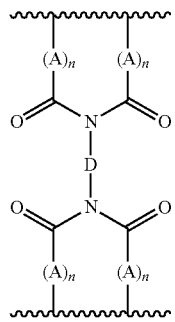

Chemical Formula 3 wherein A, n, and D are as described above.

As shown in Chemical Formula 3, the polyimide film includes a main chain of a polyimide precursor of an oligomer or a polymer and an imide group cross-linked therebetween.

Hereinafter, the embodiments are illustrated in more detail with reference to examples. However, the following examples are exemplary embodiments and are not limiting.

EXAMPLES

Polymer Synthesis 10 g of poly(ethylene-alt-maleic anhydride) (made by Sigma-aldrich) is mixed with 1 g of concentrated HCl as catalyst in 60 g of methanol and heated and agitated at 70° C. for 4 days to carry out esterification. The resultant is then cooled to room temperature, and the precipitated solid is washed with 20 g of methanol two times and dried in a vacuum oven at a temperature of 100° C. for 10 hours to provide poly(ethylene-alt-maleic acid methyl ester).

Fabrication of Polyimide Film

Example 1

1.722 g (1 equivalent) of the synthesized poly(ethylene-alt-maleic acid methyl ester) and 0.865 g (0.4 equivalent) of bis[4-(3-aminophenoxy)-phenyl]sulfone are added to 14.7 g of a mixed solvent of methanol and tetrahydrofuran (1:4 by weight) and agitated for 24 hours.

The solution is then coated on a 50×50 mm glass substrate and slowly vacuum heated from room temperature to 100° C. to evaporate the solvent. It is then heated at 200° C. under a nitrogen atmosphere for 2 hours to provide a cross-linked polyimide film.

Example 2

1.722 g (1 equivalent) of the poly(ethylene-alt-maleic acid methyl ester) and 2.054 g (0.95 equivalents) of bis[4-(3-aminophenoxy)-phenyl]sulfone are added to 21.4 g of a mixed solvent of methanol and tetrahydrofuran (1:4 by weight) and agitated for 24 hours.

A polyimide film is then fabricated in accordance with the same procedure as in Example 1.

Example 3

0.934 g (1 equivalent) of the polyethylene-alt-maleic methyl ester and 1.76 g (1.5 equivalents) of bis[4-(3-aminophenoxy)-phenyl]sulfone are added to 16.9 g of a mixed solvent of methanol and tetrahydrofuran (1:4 by weight) and agitated for 24 hours.

Then a polyimide film is fabricated in accordance with the same procedure as in Example 1.

Comparative Example 1.094 g of bicyclo[2,2,2]oct-7-ene-2,3,5,6-tetracarboxylic dianhydride and 1.905 g of bis[4-(3-aminophenoxy)-phenyl] sulfone are added to 20 g of N,N-dimethyl acetamide and agitated at room temperature for 8 hours to provide a polyamic acid solution.

Then the solution is coated on a 50 mm×50 mm glass substrate and slowly vacuum heated from room temperature to 80° C. to evaporate the solvent. It is then heated until 250° C. at a heating rate of 10° C./min at 250° C. over 30 minutes to provide a polyimide film.

Analysis

FT-IR Analysis

Figure 2:
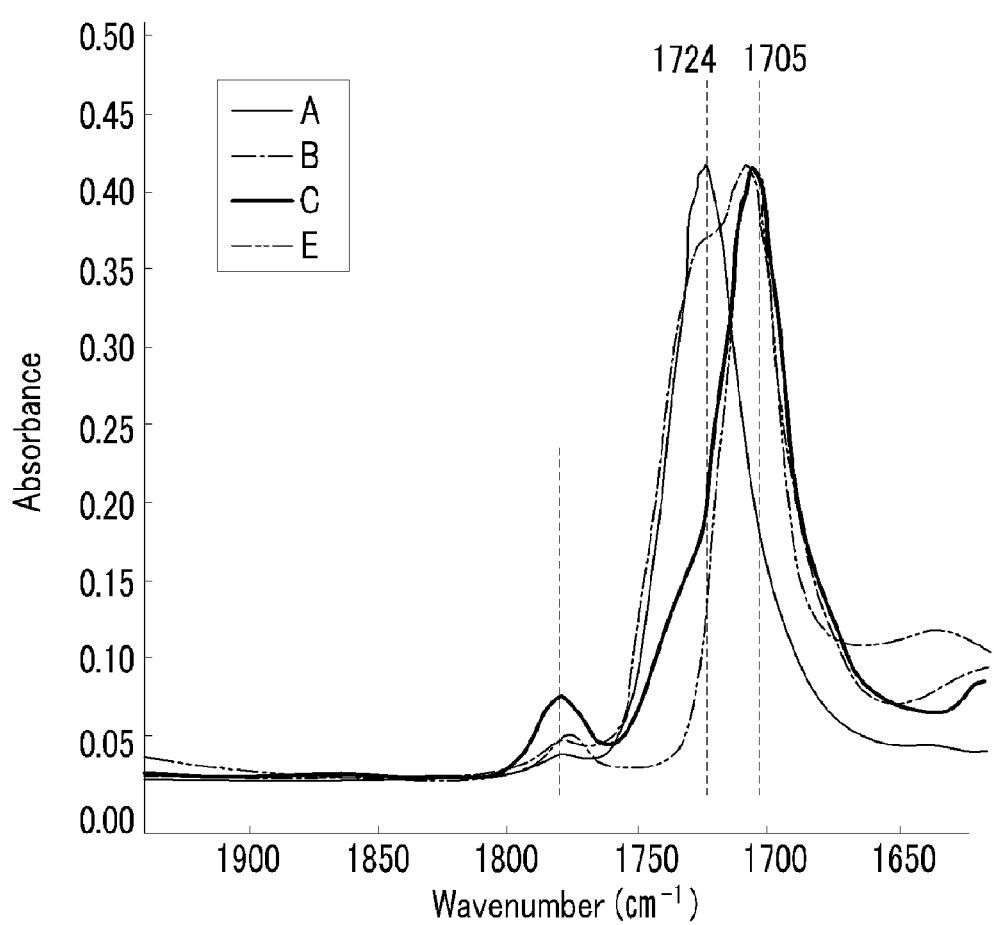

Referring to FIG. 1 and FIG. 2, each polyimide according to the examples and comparative examples is characterized by Fourier transform infrared spectroscopy (FTIR).

FIGS. 1 and 2 are FTIR spectra showing peaks corresponding to the polyimide obtained according to the examples and comparative examples.

In FIG. 1 and FIG. 2, "A" indicates a peak of poly(ethylene-alt-maleic acid methyl ester) synthesized according to the polymer synthesis example, and "B", "C", and "E" are peaks corresponding to the polyimide obtained from Example 1, Example 2, and the comparative example, respectively.

As shown in the spectra, the polyimide precursor A shows a peak at 1724 cm$^{-1}$ (ester carbonyl), and the polyimides B, C, and E each show a peak at 1705 cm$^{-1}$ (imide carbonyl).

Thus, it can be seen that the polyimide precursor is imidized under the above reaction conditions to provide the polyimide.

CP-MAS NMR Analysis

Figure 3:
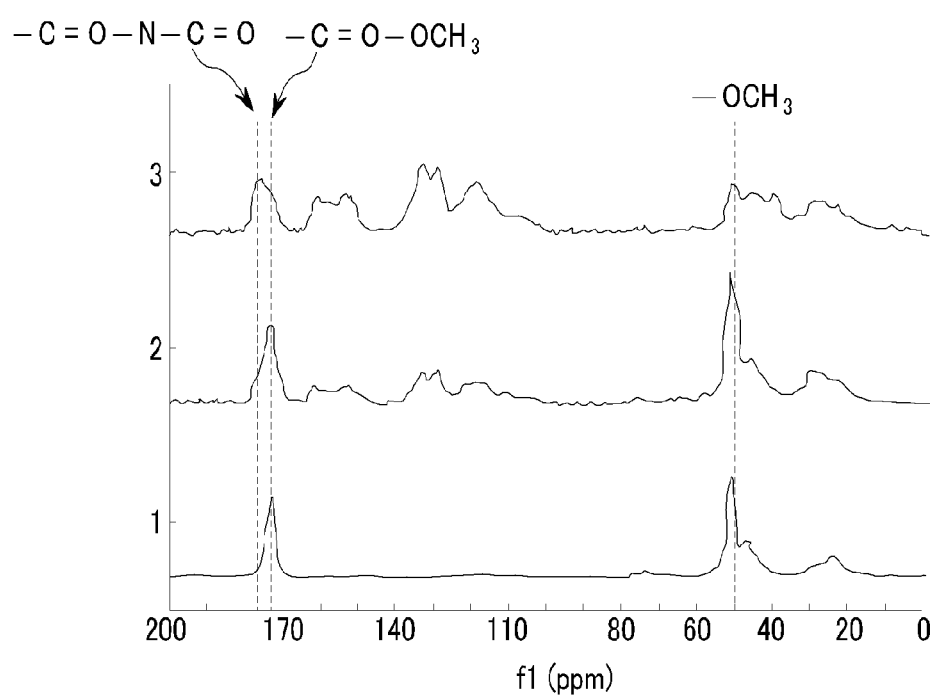
FIG. 3 is a carbon-13 cross-polarization magic angle spinning nuclear magnetic resonance ("$^{13}$C CP-MAS NMR") spectrum showing peaks corresponding to functional groups of the polyimide according to the examples.

FIG. 3 is a $^{13}$C CP-MAS NMR (carbon-13 cross polarization-magic angle spinning nuclear magnetic resonance) spectrum which shows the polyimide prepared according to the above examples.

In FIG. 3, "A" corresponds to a peak of poly(ethylene-alt-maleic acid methyl ester) synthesized according to the polymer synthesis example, and "B" and "C" are peaks corresponding to the polyimide obtained from Example 1 and Example 2, respectively.

Referring to the FIG. 3, it is seen that the polyimide precursor shows a resonance corresponding to the carbonyl carbon of the methyl ester (—C=O—OCH$_3$) at 172 ppm. Appearance of a resonance corresponding to a polyimide carbonyl carbon imide peak (—C=O—N—C=O) at 177 ppm corresponds to the decrease of the methyl ester peak at 172 ppm. In addition, in comparing Example 1 ("B") to Example 2 ("C"), it is seen that the polyimide according to Example 2 ("C"), which includes a greater amount of diamine, has a greater degree of imidization and so has a wider area for the 177 ppm peak.

In addition, it is seen that the polyimide precursor shows a higher —OCH$_3$ peak (also corresponding to the methyl ester of the precursor polymer synthesis example) at 52 ppm, but in comparison, the polyimide according to Example 1 and Example 2 each show a lower methyl ester peak at 52 ppm after imidization.

Thus, it can be seen that the polyimide precursor is imidized to provide a polyimide.

Thermal Decomposition Characteristics

Figure 4:
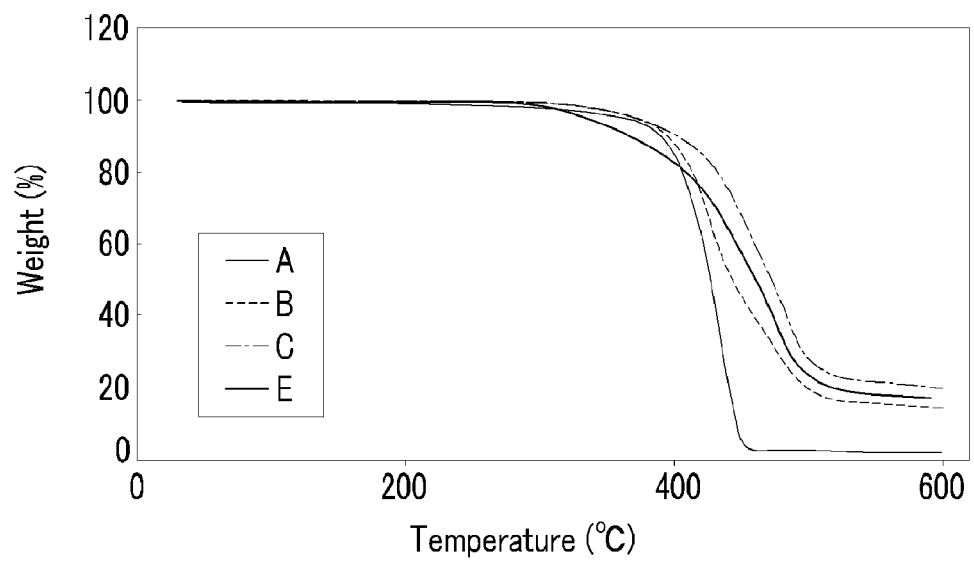
FIG. 4 is a thermogravimetric analysis ("TGA") plot of weight percent versus temperature (degrees centigrade, ° C.) showing thermal decomposition characteristics of the polyimide according to the examples.

FIG. 4 is a thermogram showing the thermal characteristics of the polyimides obtained from the examples by thermogravimetric analysis (TGA).

In FIG. 4, the TGA shows the weight variation (loss) for the polyimides obtained in the examples according to increase in temperature from room temperature (about 25° C.) to 600° C.

In FIG. 4, "A" indicates a poly(ethylene-alt-maleic acid methyl ester) which is a polymer synthesized according to the examples, and "B", "C", and "E" each correspond to the polyimides obtained from Example 1, Example 2, and the comparative example, respectively.

Referring to the thermogram, when comparing the temperature at the point when the early weight of the polyimide film (100%) decreases to 90%, it is seen that the polyimide ("E") according to the comparative example has the lowest onset temperature for decomposition/weight loss, and the polyimide ("B") according to Example 1 and the polyimide ("C") according to Example 2 have higher onset temperatures, in that order.

It is thus seen that the polyimide film according to the examples has improved thermal stability characteristics when compared to the polyimide film according to the comparative example. In addition, when the polymer ("A") is compared with the polyimides ("B'" and "'C") with which the polymer is cross-linked, the thermal stability is further improved by the cross-linking.

Glass Transition Temperature

Figure 5:
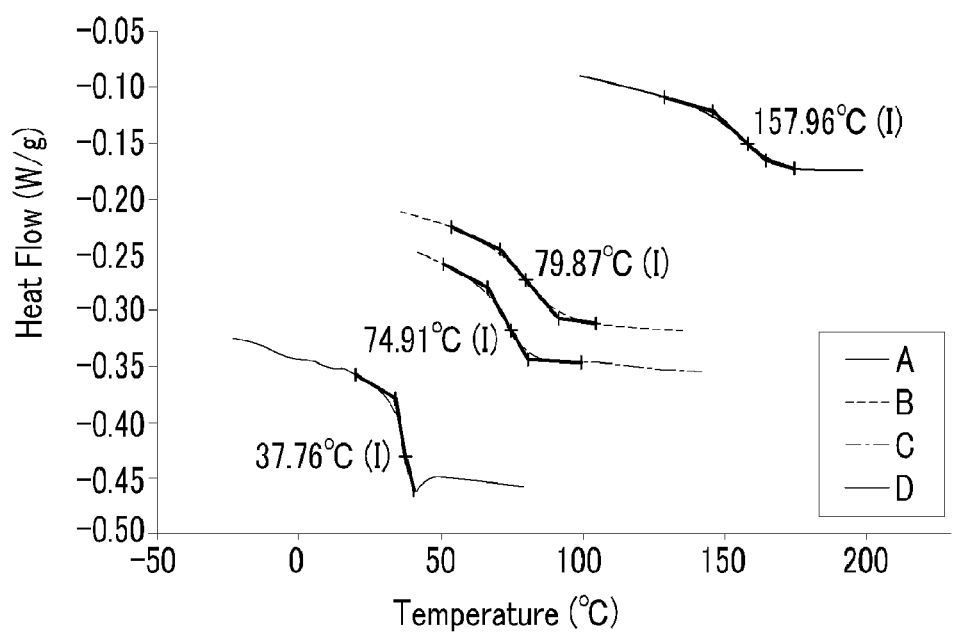
FIG. 5 is a differential scanning calorimetry ("DSC") plot showing glass transition temperature (Tg) of the polyimide according to the examples.

FIG. 5 shows glass transition temperature of the polyimides according to the examples and comparative examples by differential scanning calorimetry (DSC) at a temperature ramp rate of 10° C./min.

In FIG. 5, "A" indicates the glass transition temperature curve of poly(ethylene-alt-maleic acid methyl ester) synthesized according to the polymer synthesis example, and "B", "C", and "D" each correspond to the glass transition temperature curves of the polyimides obtained from Example 1, Example 2, and Example 3, respectively.

As seen in FIG. 5, the glass transition temperature changes significantly with the greater degrees of crosslinking in the polyimides obtained from Example 1, Example 2, and Example 3 (about 75, 80, and 158° C., respectively), where it will be appreciated that the higher the Tg, the greater the thermal and dimensional stability of the polyimide. Thus it is seen that the polyimide according to the examples has heat resistance that is changed depending upon the cross-linking rate and degree of cross-linking.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of manufacturing a cross-linked polyimide, comprising:
   reacting an oligomer or polymer having a substituted or unsubstituted carbonyl group only in a side chain and a diamine compound to form a polyamide; and
   imidizing the polyamide.

2. The method of claim 1, wherein the oligomer or polymer comprises a moiety represented by the following Chemical Formula 1, and
   the diamine compound includes a monomer represented by the following Chemical Formula 2:

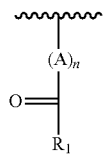

Chemical Formula 1 wherein, in the above Chemical Formula 1, the wavy line represents a main chain without a carbonyl group of the oligomer or polymer, A is a linker connecting the main chain to a carbonyl group and comprising a substituted or unsubstituted C1 to C30 alkylene, a substituted or unsubstituted C1 to C30 cycloalkylene, a substituted or unsubstituted C6 to C30 arylene, a substituted or unsubstituted C7 to C30 arylalkylene, a substituted or unsubstituted C1 to C30 heteroalkylene, a substituted or unsubstituted C2 to C30 heterocycloalkylene, or a combination thereof, n is 0 or 1, and $R_1$ is a functional group including oxygen, nitrogen, sulfur, a halogen, a metal, a metalloid, or a combination thereof, and $$H_2N-D-NH_2$$ Chemical Formula 2 wherein, in the above Chemical Formula 2, D comprises a substituted or unsubstituted C1 to C30 alkylene, a substituted or unsubstituted C3 to C30 cycloalkylene, a substituted or unsubstituted C6 to C30 arylene, a substituted or unsubstituted C7 to C30 arylalkylene, a substituted or unsubstituted C1 to C30 heteroalkylene, a substituted or unsubstituted C2 to C30 heterocycloalkylene, a substituted or unsubstituted C2 to C30 alkenylene, or a combination thereof.

3. The method of claim 2, wherein main chain of the oligomer or polymer is a homopolymer or copolymer comprising a substituted or unsubstituted polyethylene, a substituted or unsubstituted polyether, a substituted or unsubstituted polyimine, a substituted or unsubstituted polysulfone, a substituted or unsubstituted polyvinyl, a substituted or unsubstituted polyolefin, a substituted or unsubstituted polyalkyne, a substituted or unsubstituted polynorbornene, a substituted or unsubstituted polysiloxane, a substituted or unsubstituted polyphosphazene, a substituted or unsubstituted polysaccharide, or a combination thereof.

4. The method of claim 2, wherein $R_1$ is selected from the following group G:

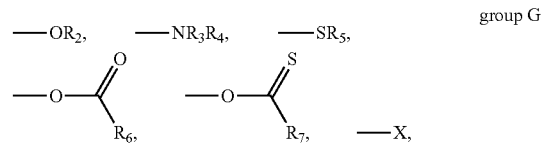

group G or a combination thereof
wherein, in the group G, each $R_2$ to $R_7$ is independently hydrogen, a substituted or unsubstituted C1 to C30 alkyl, a substituted or unsubstituted C3 to C30 cycloalkyl, a substituted or unsubstituted C6 to C30 aryl, a substituted or unsubstituted C7 to C30 arylalkyl, a substituted or unsubstituted C1 to C30 heteroalkyl, a substituted or unsubstituted C2 to C30 heterocycloalkyl, a substituted or unsubstituted C2 to C30 alkenyl, a substituted or unsubstituted C1 to C10 alkoxy, a substituted or unsubstituted C2 to C10 carbonyl, a hydroxy, or a combination thereof and X is a halogen.

5. The method of claim 1, wherein imidizing comprises heating the polyamide at a temperature of about 25 to about 350° C.

6. The method of claim 1, wherein imidizing comprises heating the polyamide at a temperature of about 100 to about 250° C.

7. The method of claim 1, wherein reacting to form the polyamide and imidizing are simultaneously performed.

8. A polyimide film comprising
a polymer obtained by cross-linking an oligomer or a polymer having a substituted or unsubstituted carbonyl group only in a side chain and a diamine compound and imidizing the cross-linked oligomer or polymer.

9. The polyimide film of claim 8, wherein the polymer is represented by the following Chemical Formula 3:

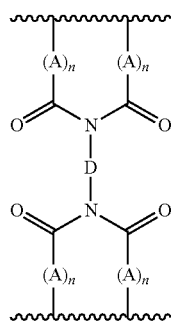

Chemical Formula 3 wherein, in the above Chemical Formula 3, the wavy line represents a main chain without a carbonyl group of the oligomer or polymer, A is a linker connecting the main chain to a carbonyl group and comprising a substituted or unsubstituted C1 to C30 alkylene, a substituted or unsubstituted C1 to C30 cycloalkylene, a substituted or unsubstituted C6 to C30 arylene, a substituted or unsubstituted C7 to C30 arylalkylene, a substituted or unsubstituted C1 to C30 heteroalkylene, a substituted or unsubstituted C2 to C30 heterocycloalkylene, or a combination thereof; n is 0 or 1, and D is a substituted or unsubstituted C1 to C30 alkylene, a substituted or unsubstituted C3 to C30 cycloalkylene, a substituted or unsubstituted C6 to C30 arylene, a substituted or unsubstituted C7 to C30 arylalkylene, a substituted or unsubstituted C1 to C30 heteroalkylene, a substituted or unsubstituted C2 to C30 heterocycloalkylene, a substituted or unsubstituted C2 to C30 alkenylene, or a combination thereof.

10. The polyimide film of claim 8, wherein the oligomer or polymer comprises a moiety represented by the following Chemical Formula 1, and the diamine compound comprises a monomer represented by the following Chemical Formula 2:

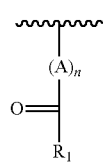

Chemical Formula 1 wherein, in the above Chemical Formula 1, the wavy line indicates a main chain without a carbonyl group of the oligomer or polymer, A is a linker connecting the main chain to a carbonyl group and comprising a substituted or unsubstituted C1 to C30 alkylene, a substituted or unsubstituted C1 to C30 cycloalkylene, a substituted or unsubstituted C6 to C30 arylene, a substituted or unsubstituted C7 to C30 arylalkylene, a substituted or unsubstituted C1 to C30 heteroalkylene, a substituted or unsubstituted C2 to C30 heterocycloalkylene, or a combination thereof, n is 0 or 1, and $R_1$ is a functional group including oxygen, nitrogen, sulfur, a halogen, a metal, a metalloid, or a combination thereof, and $$H_2N\text{-}D\text{-}NH_2 \qquad \text{Chemical Formula 2}$$

wherein, in the above Chemical Formula 2, D is a substituted or unsubstituted C1 to C30 alkylene, a substituted or unsubstituted C3 to C30 cycloalkylene, a substituted or unsubstituted C6 to C30 arylene, a substituted or unsubstituted C7 to C30 arylalkylene, a substituted or unsubstituted C1 to C30 heteroalkylene, a substituted or unsubstituted C2 to C30 heterocycloalkylene, a substituted or unsubstituted C2 to C30 alkenylene, or a combination thereof.

11. The polyimide film of claim 10, wherein main chain of the oligomer or polymer is a homopolymer or copolymer comprising a substituted or unsubstituted polyethylene, a substituted or unsubstituted polyether, a substituted or unsubstituted polyimine, a substituted or unsubstituted polysulfone, a substituted or unsubstituted polyvinyl, a substituted or unsubstituted polyolefin, a substituted or unsubstituted polyalkyne, a substituted or unsubstituted polynorbornene, a substituted or unsubstituted polysiloxane, a substituted or unsubstituted polyphosphazene, a substituted or unsubstituted polysaccharide, or a combination thereof.

12. The polyimide film of claim 10, wherein $R_1$ is selected from the following group G:

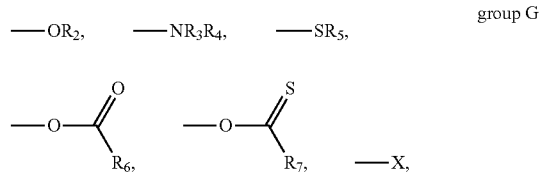

group G or a combination thereof,
wherein, in the group G, each $R_2$ to $R_7$ is independently hydrogen, a substituted or unsubstituted C1 to C30 alkyl, a substituted or unsubstituted C3 to C30 cycloalkyl, a substituted or unsubstituted C6 to C30 aryl, a substituted or unsubstituted C7 to C30 arylalkyl, a substituted or unsubstituted C1 to C30 heteroalkyl, a substituted or unsubstituted C2 to C30 heterocycloalkyl, a substituted or unsubstituted C2 to C30 alkenyl, a substituted or unsubstituted C1 to C10 alkoxy, a substituted or unsubstituted C2 to C10 carbonyl, a hydroxy, or a combination thereof, and X is a halogen.

13. The polyimide film of claim 8, wherein the carbonyl group comprises a carboxylic acid, substituted or unsubstituted carboxylate salt, a substituted or unsubstituted ester group, a substituted or unsubstituted amide group, a substituted or unsubstituted imide group, or a combination thereof.

14. The polyimide film of claim 8, wherein the polymer comprises a polyamide, a polyimide, or a mixture of a polyamide and a polyimide.

* * * * *